US012218471B2

(12) United States Patent
Liu et al.

(10) Patent No.: US 12,218,471 B2
(45) Date of Patent: Feb. 4, 2025

(54) ELECTRICAL CONNECTOR AND CABLE GROUNDING STRUCTURE THEREOF

(71) Applicant: JESS-LINK PRODUCTS CO., LTD., New Taipei (TW)

(72) Inventors: Ching-Hung Liu, New Taipei (TW); Ming-Yang Yuan, New Taipei (TW)

(73) Assignee: JESS-LINK PRODUCTS CO., LTD., New Taipei (TW)

( * ) Notice: Subject to any disclaimer, the term of this patent is extended or adjusted under 35 U.S.C. 154(b) by 396 days.

(21) Appl. No.: 17/903,958

(22) Filed: Sep. 6, 2022

(65) Prior Publication Data

US 2023/0411872 A1 Dec. 21, 2023

(30) Foreign Application Priority Data

Jun. 16, 2022 (CN) ......................... 202221520284.3

(51) Int. Cl.
*H01R 4/28* (2006.01)
*H01R 4/02* (2006.01)
(Continued)

(52) U.S. Cl.
CPC ............... *H01R 4/28* (2013.01); *H01R 4/023* (2013.01); *H01R 9/24* (2013.01); *H01R 13/2407* (2013.01);
(Continued)

(58) Field of Classification Search
CPC ...... H01R 4/28; H01R 4/023; H01R 13/6582; H01R 13/6585; H01R 13/65917; H01R 13/65918; H01R 13/2407; H01R 13/516; H01R 9/24; H01R 12/596; H01R 12/598; H01R 12/775; H01R 12/65; H01R 12/69
See application file for complete search history.

(56) References Cited

U.S. PATENT DOCUMENTS 7,192,301 B2 * 3/2007 Kuroda .............. H01R 13/6589 439/497
7,435,132 B1 * 10/2008 Fong ................ H01R 13/65918 439/497
(Continued)

FOREIGN PATENT DOCUMENTS

CN 113036539 A * 6/2021 ........... H01R 12/596

OTHER PUBLICATIONS

CN 113036539 A with machine translation.*

*Primary Examiner* — Renee S Luebke
*Assistant Examiner* — Paul D Baillargeon
(74) *Attorney, Agent, or Firm* — Chun-Ming Shih; HDLS IPR SERVICES

(57) ABSTRACT

An electrical connector and a cable grounding structure thereof are disclosed. A grounding structure is bridged between a connection body of the electrical connector and each cable, and includes a bridging portion, at least one clamping portion, at least one docking portion, and an elastic portion. The clamping portion is disposed on the bridging portion for clamping a covering layer of each cable, and the docking portion is extended from the bridging portion toward the connection body and electrically connected to connection body, and the elastic portion is attached and pressed against the covering layer of each cable, so as to provide good grounding contact and prevent the issue of skewing the cables and other factors that affects the soldering yield.

14 Claims, 6 Drawing Sheets

(51) Int. Cl.
*H01R 9/24* (2006.01)
*H01R 13/24* (2006.01)
*H01R 13/516* (2006.01)
*H01R 13/6591* (2011.01)

(52) U.S. Cl.
CPC ..... *H01R 13/516* (2013.01); *H01R 13/65912* (2020.08); *H01R 13/65914* (2020.08); *H01R 13/65917* (2020.08)

(56) References Cited

U.S. PATENT DOCUMENTS 8,900,007 B2 * 12/2014 Nonen ............. H01R 13/65917
439/497
2022/0352662 A1 * 11/2022 Zhang .................... H01R 24/40

* cited by examiner

ELECTRICAL CONNECTOR AND CABLE GROUNDING STRUCTURE THEREOF

BACKGROUND OF THE DISCLOSURE

Technical Field

The technical field relates to a wire-end connector, and more particularly relates to an electrical connector and a cable grounding structure thereof.

Description of Related Art

In the electrical connector currently applied to the wire end, a cable with a covering layer made of aluminum foil or copper foil can be used to achieve the shielding effect and avoid signal interference. However, it requires stable contact with the grounding end of the electrical connector and effective conductive grounding.

In the related art, a grounding plate is mainly added to contact with the covering layer of each cable, and thus it is difficult to ensure that each cable has a stable contact with the covering layer. Furthermore, the existing designs of the cables do not have a precise clamping or positioning effect, so that the grounding plate may push against the cables and cause a skewness easily when the grounding plate contacts the covering layer of each cable, thus affecting the precise soldering with the electrical connector, and even resulting in yield reduction.

In view of the aforementioned problems, the discloser proposed this disclosure based on his expert knowledge and elaborated researches to overcome the problems of the related art.

SUMMARY OF THE DISCLOSURE

The primary objective of this disclosure is to provide an electrical connector and a cable grounding structure of the electrical connector. Through a design with clamping and elastic abutting effects, the electrical connector and the cable may achieve a good grounding contact on the covering layer of the cable which is made of aluminum foil or copper foil, and this design may also prevent the cable from being skewed and other factors that affect the soldering yield.

To achieve the aforementioned objective, this disclosure discloses an electrical connector that includes a connection body, a cable rack, a plurality of cables, and at least one grounding structure; the connection body has a terminal block, and a plurality of terminals installed on the terminal block and each terminal is extended from the front edge of the terminal block, and each terminal has a soldering portion disposed on the rear edge of the terminal block; the cable rack is installed to the rear edge of the terminal block; each cable is disposed on the cable rack and has a cable core segment exposed toward the connection body, and a covering layer covers the cable core segment; and the grounding structure bridges the connection body with the cables and has a bridging portion, at least one clamping portion disposed on the bridging portion, at least one docking portion extended from the bridging portion toward the connection body, and an elastic portion disposed opposite to the clamping portion. The clamping portion of the grounding structure clamps the covering layer of each cable, and the elastic portion is pressed on the covering layer in a direction opposite to the clamping portion, and the docking portion of the grounding structure and the cable core segment of each cable are electrically connected to the soldering portion of each terminal.

To achieve the aforementioned objective, this disclosure also discloses a cable grounding structure of the electrical connector, and the electrical connector includes a connection body and a plurality of cables electrically connected to the connection body, and the cable includes a covering layer, and the grounding structure is provided to be bridged between the connection body and the cable, and the grounding structure includes: a bridging portion; at least one clamping portion disposed on the bridging portion and provided to be clamped on the covering layer of the cable; at least one docking portion extended from the bridging portion toward the connection body, and electrically connected to the connection body; and an elastic portion disposed opposite to the clamping portion, and attached and pressed against the covering layer of the cable in a direction opposite to the clamping portion.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
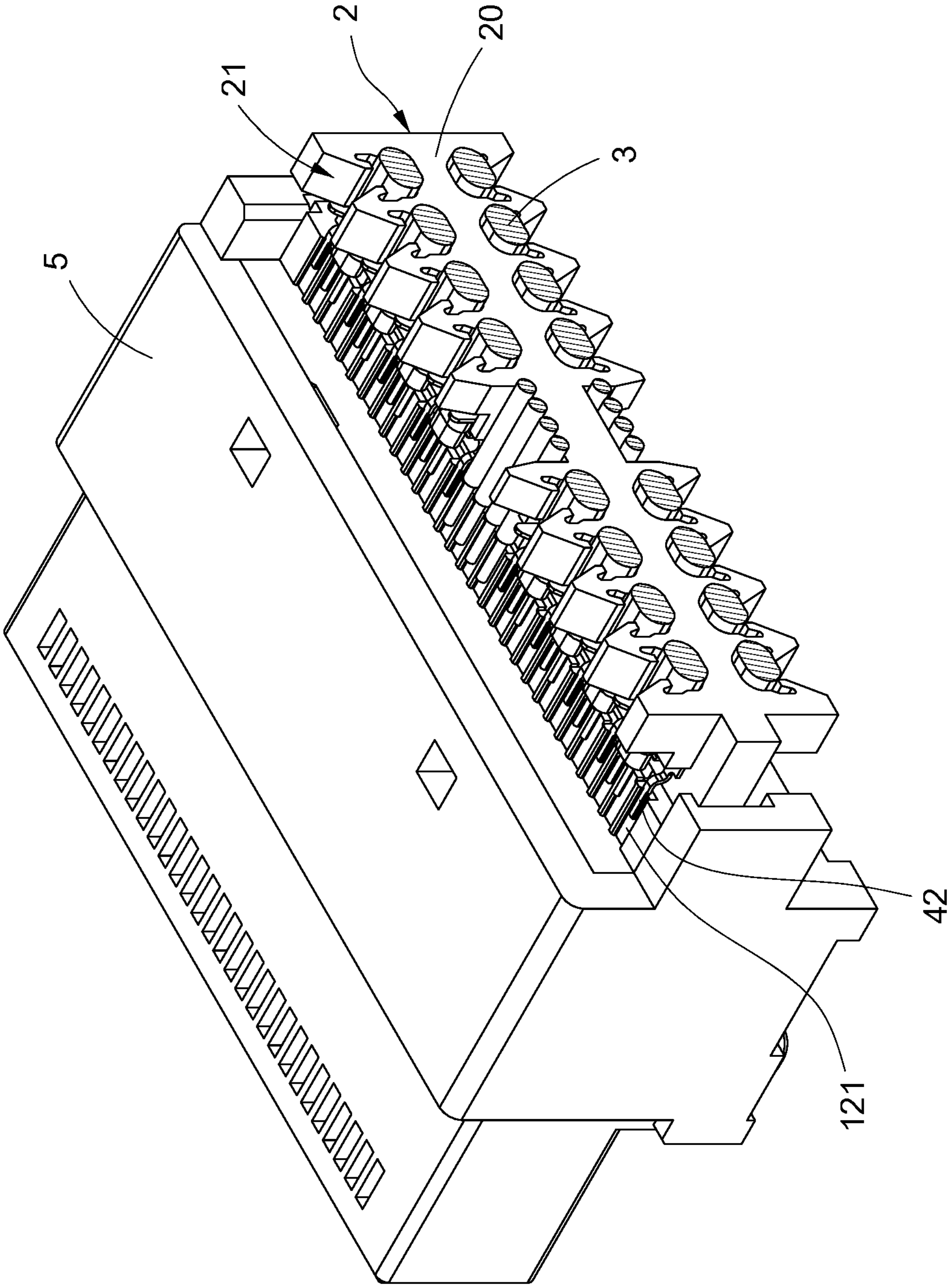
FIG. 1 is a perspective view of an electrical connector of this disclosure.
Figure 2:
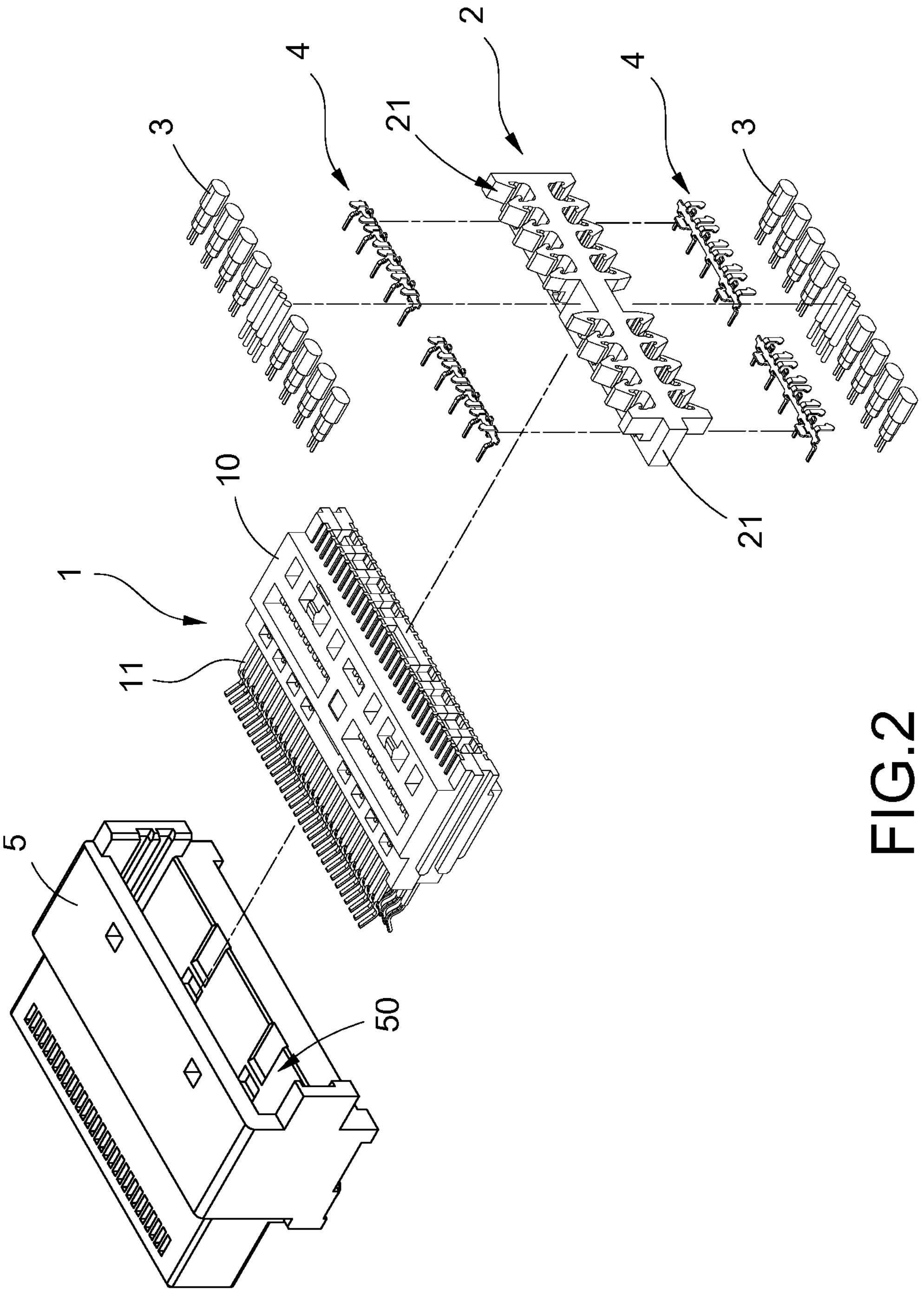
FIG. 2 is an exploded view of an electrical connector of this disclosure.

With reference to FIGS. 1 and 2 for the perspective view and exploded view of an electrical connector of this disclosure respectively, the electrical connector and its cable grounding structure, the electrical connector includes a connection body 1, a cable rack 2, a plurality of cables 3, and at least one grounding structure 4.

Figure 3:
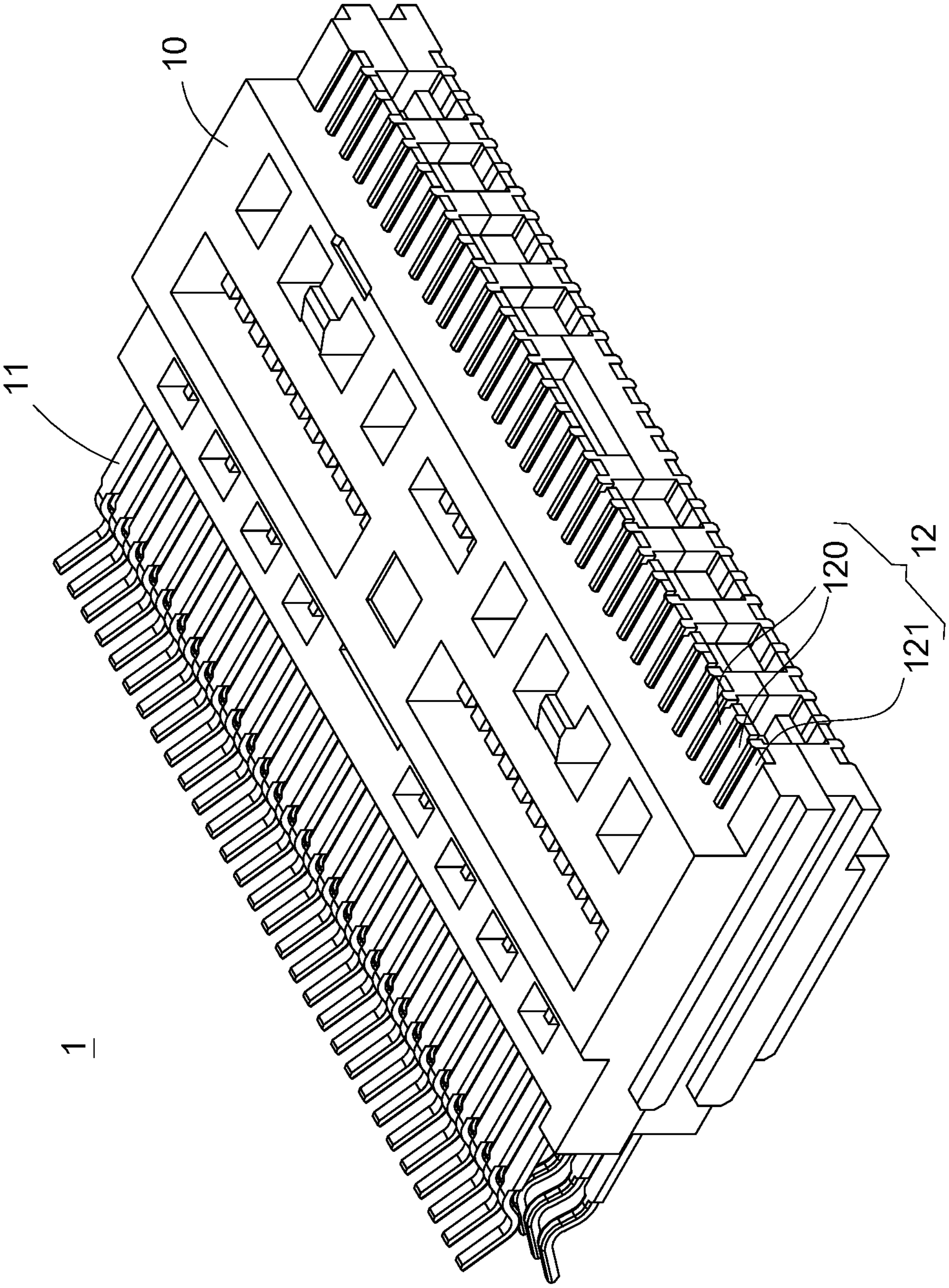
FIG. 3 is a perspective view of a connection body of this disclosure.

In FIG. 3, the connection body 1 has a terminal block 10, and a plurality of terminals 11 installed on the terminal block 10, and the terminals 11 is extended from the front edge of the terminal block 10, and each terminal 11 has a soldering portion 12 disposed on the rear edge of the terminal block 10 for electrically connecting each cable 3. The soldering portions 12 may be divided into a first soldering portion 120 and a second soldering portion 121 by the pin definition of each terminal 11. For example, the terminal 11 corresponding to the first soldering portion 120 is a power terminal or a signal terminal, and the terminal 11 corresponding to the second soldering portion 121 is a grounding terminal.

Figure 4:
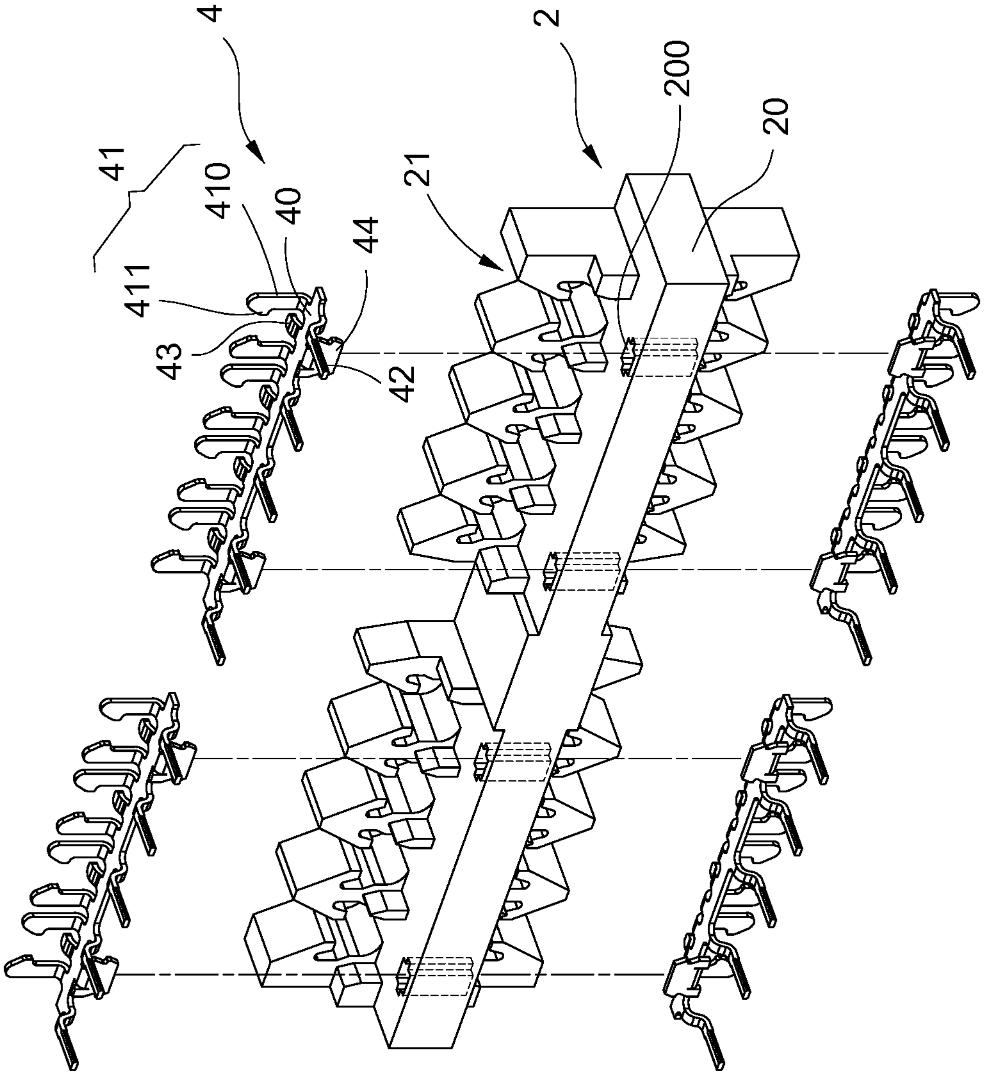
FIG. 4 is an exploded view of a grounding structure and a cable rack of this disclosure, viewing from another angle.

The cable rack 2 is installed at the rear edge of the terminal block 10 and provided for each cable 3 to span across, such that each cable is aligned precisely with the soldering portion 12 of each terminal 11 for the purpose of soldering. In an embodiment of this disclosure as shown in FIG. 4, the cable rack 2 has a rack body 20 extended corresponding to the arranging direction of each terminal 11, and the upper and lower surfaces of the rack body 20 are provided for spanning a plurality of cables 3 arranged horizontally across the rack body 20 (as shown in FIG. 1). The rack body 20 has a cable slot 21 disposed corresponding to each cable 3 and arranged on the upper and lower surfaces of the rack body 20 separately for setting the cables 3 on the upper and lower rows of the cable rack 2 as well as providing upper and lower configurations of the connection body 1 in correspondence with the terminals 11 respectively.

Figure 5:
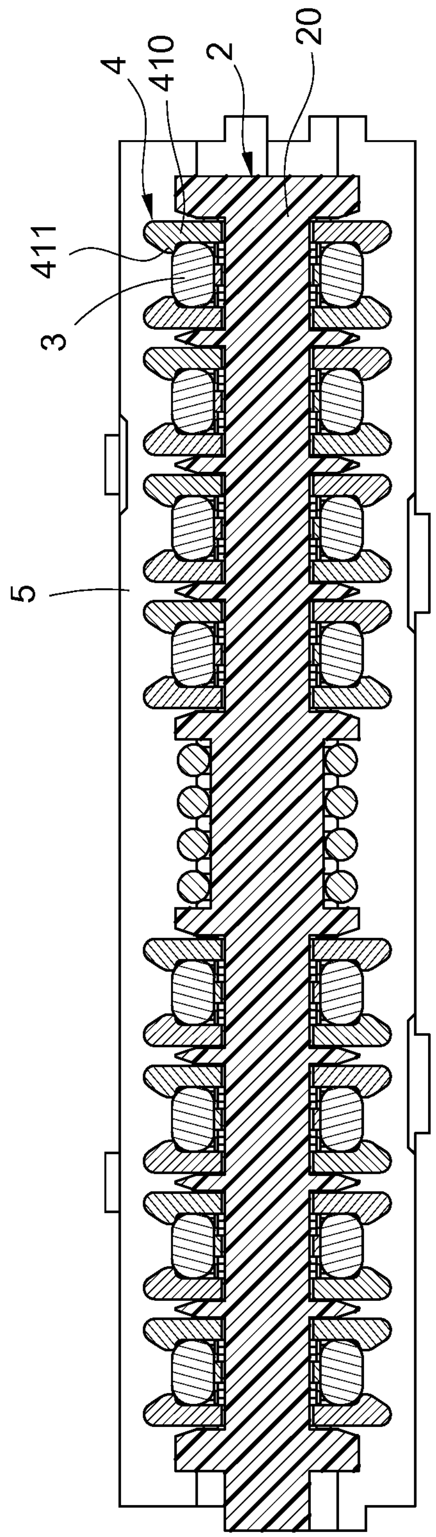
FIG. 5 is a cross-sectional view of an electrical connector at a cable rack of this disclosure.

Further, the grounding structure 4 may be made by stamping and bending a metal sheet. The grounding structure 4 may be bridged between the connection body 1 and each cable 3, and may also be mounted on the rack body 20 of the cable rack 2. In FIG. 4, the grounding structure 4 mainly includes a bridging portion 40, at least one clamping portion 41 disposed on the bridging portion 40, at least one docking portion 42 extended from the bridging portion 40 toward the connection body 1, and an elastic portion 43 disposed opposite to the clamping portion 41. In FIGS. 4 and 5, the grounding structures 4 may be arranged on the cable rack 2 according to the quantity of cables 3, such that each of the cables 3 has one corresponding clamping portion 41, and each clamping portion 41 has two clamping arms 410 which are spaced and arranged opposite to each other and provided for installing the corresponding cable 3 into the cable slot 21, and then clamping the cable 3. Further, the opposite inner edges of the two clamping arms 410 are provided with a snap-on rim 411 separately to prevent the cable 3 from falling off or being skewed. In addition, the grounding structure 4 may also be bent from the bridging portion 40 toward the cable rack 2 to form a tab 44, which is embedded in the rack body 20 of the cable rack 2 for fixation, and the rack body 20 may also be provided with an insert slot 200 corresponding to the tab 44, and the insert slot 200 can penetrate through the rack body 20 according to the required quantity of grounding structures 4 arranged at the upper and lower surfaces of the rack body 20, and a plurality of grounding structures 4 may be penetrated through the rack body 20.

Figure 6:
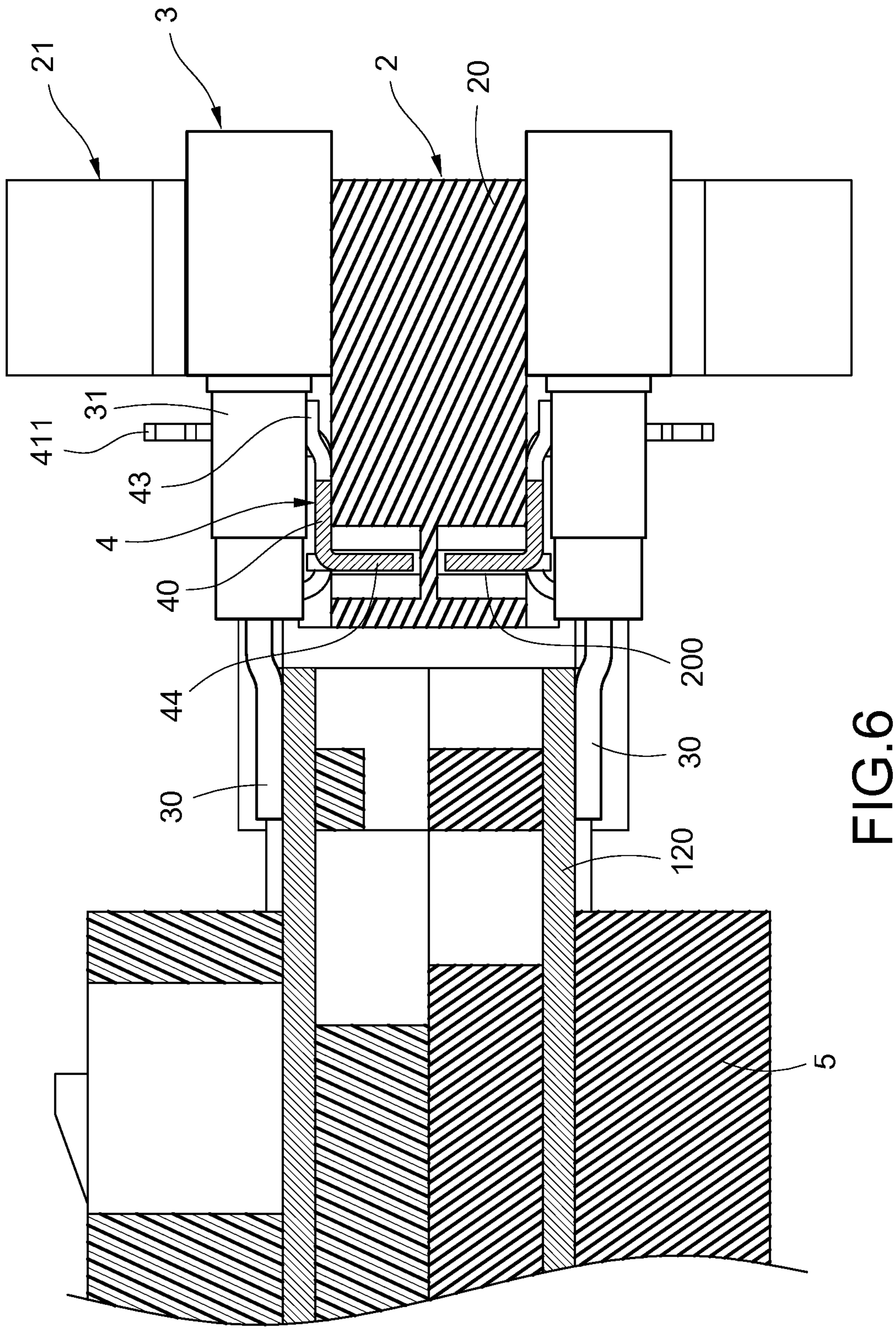
FIG. 6 is a side cross-sectional view of an electrical connector of this disclosure.

In FIGS. 1 and 6, each cable 3 protrudes from the cable slot 21 of the cable rack 2 toward the connection body 1, and includes an exposed cable core segment 30, and a covering layer 31 covering the cable core segment 30, and the cable core segment 30 is provided to be soldered to the first soldering portion 120 of the connection body 1, and the second soldering portion 121 of the connection body 1 is provided to be soldered to the docking portion 42 of the grounding structure 4, and the clamping portion 41 of the grounding structure 4 clamps the covering layer 31 of the cable 3, and the elastic portion 43 is pressed against the covering layer 31 in a direction opposite to the clamping portion 41, thereby achieving the grounding effect of the connection body 1 and each cable 3.

In FIGS. 1 and 2, the connection body 1 may also be installed in a plug housing 5, a mounting hole 50 is formed at the rear end of the plug housing 5 and communicates with the interior of the plug housing 5, so that the connection body 1 is inserted into the plug housing 5 through the mounting hole 50 and each terminal 11 is hidden near the front end in the plug housing 5 to facilitate plugging and connecting a docking socket (not shown in the figures).

By the aforementioned structure, the electrical connector and cable grounding structure of this disclosure is obtained.

As shown in FIG. 6, this disclosure may ensure the grounding contact with the covering layer 31 of the cable 3 through the elastic portion 43 of the grounding structure 4. Since the elastic portion 43 is attached and pressed against the covering layer 31 in a direction opposite to the clamping portion 41, the clamping portion 41 may prevent the cable 3 from falling off or being skewed, and the cable core segment 30 is maintained within the original precise range for the purpose of soldering with the soldering portion 12 of the terminal 11 to avoid yield reduction. Therefore, this disclosure may ensure the grounding and soldering effects of the connection body 1 and the cable 3 effectively.

In summation of the description above, this disclosure achieves the expected effects, overcomes the drawbacks of the related art.

While this disclosure has been described by means of specific embodiments, numerous modifications and variations could be made thereto by those skilled in the art without departing from the scope and spirit of this disclosure set forth in the claims.

What is claimed is:

1. An electrical connector, comprising:

a connection body, comprising a terminal block, and a plurality of terminals installed on the terminal block and extended from a front edge of the terminal block, and each terminal comprising a soldering portion disposed on a rear edge of the terminal block;

a cable rack, installed to the rear edge of the terminal block;

a plurality of cables, disposed on the cable rack, and comprising a cable core segment exposed toward the connection body, and a covering layer covering the cable core segment; and at least one grounding structure, bridging the connection body and the cables, and comprising a bridging portion, at least one clamping portion disposed on the bridging portion, at least one docking portion extended from the bridging portion toward the connection body, and an elastic portion disposed opposite to the clamping portion;

wherein, the clamping portion of the grounding structure clamps the covering layer of each cable, the elastic portion is pressed at the covering layer in a direction opposite to the clamping portion, and the docking portion of the grounding structure and the cable core segment of each cable are electrically coupled to the soldering portion of each terminal.

2. The electrical connector according to claim 1, wherein a plurality of soldering portions of the terminals are divided into a first soldering portion and a second soldering portion, and each terminal corresponding to the second soldering portion is a ground terminal and electrically coupled to the docking portion of the grounding structure.

3. The electrical connector according to claim 1, wherein the cable rack comprises a rack body extended corresponding to the arranging direction of the terminals, and the rack body comprises a cable slot disposed corresponding to each cable.

4. The electrical connector according to claim 3, wherein the bridging portion of the grounding structure is disposed on the rack body.

5. The electrical connector according to claim 4, wherein the bridging portion is a tab bent toward the cable rack and embedded in the rack body.

6. The electrical connector according to claim 5, wherein the rack body comprises an insert slot disposed corresponding to the tab to embed the tab.

7. The electrical connector according to claim 3, wherein the cables are arranged horizontally and disposed spacedly on an upper surface and a lower surface of the rack body.

8. The electrical connector according to claim 7 wherein the terminals arranged oppositely on two sides of the connection body are corresponding to a plurality of grounding structures respectively.

9. The electrical connector according to claim 1, wherein the clamping portion of the grounding structure comprises two clamping arms spaced from each other to clamp each cable correspondingly.

10. The electrical connector according to claim 9 wherein a snap-on rim is disposed protrusively on an inner edge of each clamping arm.

11. A cable grounding structure of an electrical connector, the electrical connector comprising a connection body, and a plurality of cables electrically coupled to the connection body, and each cable comprising a covering layer, and the cable grounding structure provided to be bridged between the connection body and the cable, and the cable grounding structure comprising:

a bridging portion;

at least one clamping portion, disposed on the bridging portion to clamp the covering layer of the cable;

at least one docking portion, extended from the bridging portion toward the connection body, and electrically coupled to the connection body; and an elastic portion, disposed opposite to the clamping portion, and pressed on the covering layer of the cable in a direction opposite to the clamping portion.

12. The cable grounding structure according to claim 11, wherein the bridging portion further comprises a tab bent therefrom.

13. The cable grounding structure according to claim 11, wherein the clamping portion of the grounding structure comprises two clamping arms spaced from each other to clamp each cable correspondingly.

14. The cable grounding structure according to claim 13, wherein each clamping arm comprises a snap-on rim disposed protrusively from an inner edge thereof.

* * * * *